United States Patent [19]
Fangio

[11] Patent Number: 5,744,876
[45] Date of Patent: Apr. 28, 1998

[54] CAPACITIVE BACKUP POWER SOURCE FOR ELECTROMECHANICAL ACTUATOR

[75] Inventor: William Newton Fangio, Carlsbad, N. Mex.

[73] Assignee: WNF-1, Carlsbad, N. Mex.

[21] Appl. No.: 316,832

[22] Filed: Sep. 30, 1994

[51] Int. Cl.$^6$ ........................................ H02J 7/00
[52] U.S. Cl. ........................ 307/66; 307/64; 307/65; 307/108; 307/109; 361/156; 361/160; 361/170; 361/152
[58] Field of Search .................. 307/64, 65, 66, 307/108, 109; 361/160, 156, 170, 152, 92

[56] References Cited

U.S. PATENT DOCUMENTS

| | | | |
|---|---|---|---|
| 2,807,009 | 9/1957 | Rowell | 361/160 |
| 4,186,420 | 1/1980 | Van Hise | 361/194 |
| 4,352,138 | 9/1982 | Giker | 361/92 |
| 4,496,168 | 1/1985 | D'Antonio et al. | |
| 4,558,391 | 12/1985 | Ward et al. | 361/155 |
| 5,012,121 | 4/1991 | Hammond et al. | 307/64 |

Primary Examiner—William M. Shoop, Jr.
Assistant Examiner—Kim Lockett
Attorney, Agent, or Firm—Gregory M. Howison; Joseph Shallenburger

[57] ABSTRACT

The present invention disclosed and claimed herein comprises a backup power system to supply current to an electromechanical actuator (50) to position a mechanical device (52) to a fail-safe position upon failure of a primary electric power source (12). A capacitor (40) is provided for storing energy. The capacitor (40) is charged by the primary electric power source (12). A relay device (35) is also provided for disconnecting the primary control signal upon failure of the primary electric power source (12) and connecting the capacitor (40) to the electromechanical actuator (50) to supply electric current to the electromechanical actuator (50) to position the mechanical device (52) to a fail-safe position. The relay device (35) comprises a transistor (32) which is kept turned off by the primary electric power source (12) and upon failure of the primary electric power source (12), turns on and energizes an electric relay coil (34). A timing capacitor (28) is provided to provide power and keep the transistor (32) off during brief power interruptions of the primary electric power source (12). A secondary backup capacitor (22) is provided to keep the transistor turned on for a given period of time when the electric power source fails. A limit switch (48) is also provided which is engaged when the mechanical device (52) reaches a fail-safe position and disconnects power to the electromechanical actuator (50).

16 Claims, 1 Drawing Sheet

5,744,876

CAPACITIVE BACKUP POWER SOURCE FOR ELECTROMECHANICAL ACTUATOR

TECHNICAL FIELD OF THE INVENTION

The present invention pertains in general to fail-safe features for electromechanical actuators and more particularly, relates to a method for storing energy to control electromechanical actuators upon loss of power.

BACKGROUND OF THE INVENTION

There are many actuators to move valves and other similar items in the field. These are being used in oil fields, aircraft and test cells, etc. Many of them require fail-safe mode on loss of power. For example, they must open or close fully. The energy to perform the fail-safe operation is generally stored in springs, batteries or atmospheric pressure.

The most common method being currently used by electromechanical actuators to achieve the fail-safe feature is to store energy in a spring. This means that the actuator must not only provide the force necessary to operate the item being controlled, but also be capable of compressing the spring. Upon loss of electrical power, the spring releases its energy and returns to its designated fail-safe condition. When this is done, the prime mover, such as an electromechanical actuator, must be double strength because it must move the item being controlled and also compress the spring.

SUMMARY OF THE INVENTION

The present invention disclosed and claimed herein comprises a backup power system and method to supply current to an electromechanical actuator to position a device to a fail-safe position upon failure of a primary electric power source. A capacitor is provided for storing energy. The capacitor is charged by the primary electric power source. A relay device is also provided for disconnecting the primary control signal upon failure of the primary electric power source and connecting the capacitor to the electromechanical actuator to supply electric current to the electromechanical actuator to position the device to a fail-safe position. The relay device comprises a transistor which is kept turned off by the primary electric power source and, upon failure of the primary electric power source, turns on and energizes an electric relay switch. Another capacitor is provided to provide power and keep the transistor off during brief power interruptions of the primary electric power source. A third capacitor is provided to keep the transistor turned on for a given period of time when the electric power source fails. A limit switch is also provided which is engaged when the mechanical device reaches a fail-safe position and disconnects power to the electromechanical actuator.

BRIEF DESCRIPTION OF THE DRAWINGS

For a more complete understanding of the present invention and the advantages thereof, reference is now made to the following description taken in conjunction with the accompanying Drawing in which.

DETAILED DESCRIPTION OF THE INVENTION

Figure 1:
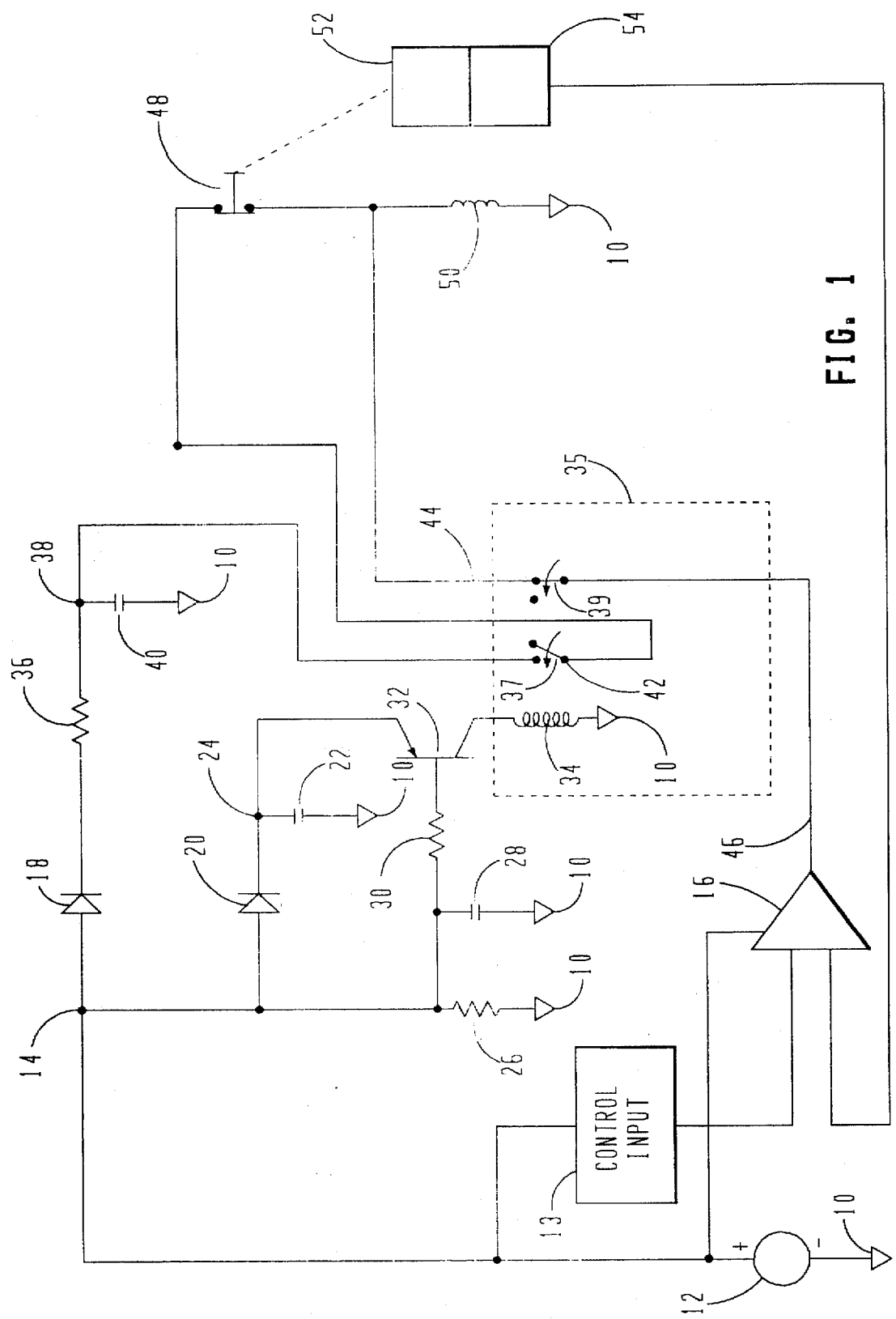
FIG. 1 is a schematic diagram of the system of the present invention.

Referring now to FIG. 1, there is illustrated a schematic diagram of the system of the present invention. A 24 volt primary power source 12 is provided. The primary power source 12 has its negative side connected to ground. The positive side of the primary power source 12 is connected to a node 14. The primary power source 12 is a 24 volt direct current power source. A control input 13 is provided and receives power from the power source 12. Also provided is a servo amplifier driver 16 having two inputs, one power input and one output. One input receives a control signal from the control input 13 and the power input receives power from power source 12. Also provided is a blocking diode 18 having an anode and a cathode. The anode of blocking diode 18 is connected to node 14. Another blocking diode 20 is also provided. Blocking diode 20 has an anode and a cathode, the anode being connected to the node 14 as is blocking diode 18. A 6800 microfarad capacitor 22 is also provided with one side thereof connected to the cathode of blocking diode 20 and the other side thereof connected to ground 10. The cathode of blocking diode 20 which is connected to capacitor 22 is a node 24. A 10 kilohm resistor 26 is provided with one end of resistor 26 connected to node 14 and the other end of resistor 26 connected to ground 10. A 10 microfarad capacitor 28 is provided with one side of capacitor 28 being attached to the node 14 with the opposite side of capacitor 28 being connected to ground 10. A 1 kilohm resistor 30 is provided with one side thereof being connected to node 14. A bi-polar PNP transistor 32 having a base, emitter and collector is provided. The other side of resistor 30 is connected to the base of transistor 32. The emitter of transistor 32 is connected to the node 24. A dual pole dual throw relay switch 35 is provided, comprising a relay coil 34, and two switches 37 and 39. One side of coil 34 is connected to the collector of transistor 32 and the other side thereof connected to ground 10. Switch 37 is a normally open switch between nodes 38 and 42. Switch 39 is a normally closed switch between nodes 46 and 44. A 47 ohm resistor 36 is provided with one end of resistor 36 connected to the cathode of blocking diode 18 and the other end of resistor 36 connected to the node 38. A 0.99 farad capacitor 40 is provided with one side connected to the node 38 and the other side thereof connected to ground 10. The output of driver 16 is connected to the node 46. A limit switch 48 is provided with one side thereof connected to node 42 and the other side thereof connected to the node 44. Then, node 44 is connected to the input of electromechanical actuator 50 and the output of electromechanical actuator 50 is connected to ground 10. A mechanical device 52 is movably connected to electromechanical actuator 50. A feedback element 54 is provided and connected to monitor the mechanical device 52. The output of feedback element 54 is connected to the open input of driver 16. Relay 35 is connected such that when not energized, the node 46 is connected to the node 44. When relay coil 34 is energized, relay 35 disconnects node 46 from 44 and connects node 38 to 42.

In operation, mechanical device 52 may be something such as a valve proportionally controlled by electromechanical actuator 50 and may also be a fuel control or any other device which may be controlled by an electromechanical actuator. The driver 16 acts as a servo-amplifier taking power from primary source 12 and supplying it through the node 46 and the node 44 to power and control electromechanical actuator 50, when switch 39 is in the normally closed position. The feedback element 54 senses the position of device 52 and feeds that information to driver 16. The primary power source 12 also charges capacitor 40 through blocking diode 18 and resistor 36. Capacitor 22 is charged through blocking diode 20, and capacitor 28 is charged through the node 14. As long as the primary power source 12 supplies power to the node 14, the emitter of transistor 32 which is connected to the node 24 is held at 24 volts DC and the base of transistor 32 which is connected to resistor 30 is also held at 24 volts DC and transistor 32 is kept turned off, thereby keeping relay coil 34 de-energized. This in turn keeps the node 46 connected to the node 44 and in turn, keeps the primary control signal from driver 16 connected to electromechanical actuator 50. Upon loss of primary power source 12, capacitor 28 begins to discharge through resistor 26 which in turn drives the base of transistor 32 in a negative direction. The value of resistor 26 and capacitor 28 is selected to keep transistor 32 in the off state during brief power interruptions. Capacitor 28 will eventually discharge to zero volts. When the base of transistor 32 becomes nominally 0.7 volts more negative than the emitter of transistor 32, transistor 32 switches on. This in turn energizes the relay coil 34. Transistor 32 will remain on for approximately ten seconds, utilizing the energy stored in capacitor 22. With the relay coil 34 energized, the normally open contact between nodes 38 and 42 in switch 37 are connected to each other and normally closed contacts between nodes 46 and 44 are opened by switch 39, which disconnects the primary control signal running through driver 16 to the electromechanical actuator 50. The primary control signal supplied through switch 39 need not necessarily be disconnected at this time, but it is disconnected at this time in this embodiment. When nodes 38 and 42 are connected, this allows capacitor 40 to supply current to and control the electromechanical actuator 50 which in turn moves the mechanical device 52 to its fail-safe position. When the mechanical device 52 reaches its fail-safe position, the limit switch 48 is engaged which opens the circuit such that current ceases to flow to electromechanical actuator 50 from capacitor 40 and all activity ceases.

Even though the threshold value for turning on the transistor 32 is 0.7 volts in this embodiment, the threshold may be changed by adding additional diodes in series with diode 20 or by replacing diode 20 with a Zener diode.

In summary, there has been provided a backup power system to supply current to an electromechanical actuator to position a device to a fail-safe position upon failure of a primary electric power source. A capacitor is provided for storing energy and is charged by the primary electric power source. A relay device is also provided for disconnecting the primary control signal upon failure of the primary electric power source and connecting the capacitor to the electromechanical actuator to supply electric current to the electromechanical actuator to position the device to a fail-safe position. The relay device comprises a transistor which is kept turned off by the primary electric power source and upon failure of the primary electric power source, turns on and energizes an electric relay switch. Another capacitor is provided to provide power and keep the transistor off during brief power interruptions of the primary electric power source. A third capacitor is provided to keep the transistor turned on for a given period of time when the electric power source fails. A limit switch is also provided which is engaged when the mechanical device reaches a fail-safe position and disconnects power to the electromechanical actuator.

Although the preferred embodiment has been described in detail, it should be understood that various changes, substitutions and alterations can be made therein without departing from the spirit and scope of the invention as defined by the appended claims.

What is claimed is:

1. A backup power system for supplying, during a power failure condition, power to an electromechanical actuator that is operable to positionally control a mechanical device, which electromechanical actuator in a non-power failure condition operates in response to a primary control signal to positionally control the mechanical device and with the mechanical device having a range of movement with one position being a fail-safe position, comprising:

a primary power source;

a control system for generating the primary control signal for controlling the electromechanical actuator during the non-power failure condition and powered by said primary power source;

a primary backup capacitor for storing at least a powering level of energy, said primary backup capacitor being charged with said powering level of energy from said primary power source;

a power failure sensor for detecting a power failure condition of said primary power source; and a backup power device for powering the electromechanical actuator with said primary backup capacitor in response to detection of the power failure condition of said primary power source by said power failure sensor, the mechanical device positioned to the fail-safe position in response to the electromechanical actuator being powered from said primary backup capacitor, which said backup power device and said primary backup capacitor with said powering level of energy are able to power the electromechanical actuator to position the mechanical device from any position in its range of motion to the fail-safe position, at which time powering of the electromechanical actuator from the primary backup capacitor is terminated.

2. A backup power system for supplying, during a power failure condition, power to an electromechanical actuator that is operable to positionally control a mechanical device, which electromechanical actuator in a non-power failure condition operates in response to a primary control signal to positionally control the mechanical device, comprising:

a primary power source;

a control system for generating the primary control signal for controlling the electromechanical actuator during the non-power failure condition and powered by said primary power source;

a primary backup capacitor for storing energy, said primary backup capacitor being charged from said primary power source;

a power failure sensor for detecting a power failure condition of said primary power source;

a backup power device for powering the electromechanical actuator with said primary backup capacitor in response to detection of the power failure condition of said primary power source by said power failure sensor, the mechanical device positioned to a fail-safe position in response to the electromechanical actuator being powered from said primary backup capacitor, at which time powering of the electromechanical actuator from the primary backup capacitor is terminated; and a limit switch which is engaged when the mechanical device reaches the fail-safe position and terminates delivery of power to the electromechanical actuator from said primary backup capacitor.

3. The system of claim 1 wherein said power failure sensor comprises a transistor having a base, emitter and collector, said transistor turned off by the primary power source and upon failure of the primary power source is turned on and thereby energizes an electric relay switch, which connects said primary backup capacitor to said electromechanical actuator.

4. The system of claim 1, wherein said power failure sensor comprises:
   a switch operable to selectively connect said primary backup capacitor to the electromechanical actuator;
   a switch actuator for selectively actuating said switch when the voltage of the primary power source falls below a predetermined level; and
   a secondary backup capacitor being charged from the primary source and operable to power said switch actuator during failure of the primary power source.

5. The system of claim 3 and further comprising a capacitor connected to said base of said transistor to provide power to keep said transistor off during brief electrical power interruptions of the primary power source.

6. The system of claim 3 and further comprising a capacitor connected to the emitter of said transistor to keep said transistor turned on for a given period of time when the primary power source fails.

7. The system of claim 3 and further comprising a capacitor connected to said emitter of said transistor to power said electric relay switch when the primary power source fails.

8. A method for supplying, during a power failure condition, power to an electromechanical actuator that is operable to positionally control a mechanical device, which electromechanical actuator in a non-power failure condition operates in response to a primary control signal to positionally control the mechanical device, comprising:
   generating the primary control signal from a primary power source for controlling the mechanical device during the non-power failure condition;
   charging a primary backup capacitor for storing energy, the primary backup capacitor being charged from the primary power source;
   detecting a power failure condition of the primary power source; and
   powering the electromechanical actuator with the primary backup capacitor in response to detection of the power failure condition of the primary power source, the mechanical device positioned to a fail-safe position in response to the electromechanical actuator being powered by the primary backup capacitor, at which time the step of powering from the primary backup capacitor is terminated.

9. The system of claim 3, and further comprising a secondary backup capacitor for powering said transistor upon failure of the primary power source.

10. The method of claim 8 wherein the termination of the step of powering is facilitated by a limit switch which is engaged when the mechanical device reaches the fail-safe position to terminate delivery of power to the electromechanical actuator from the primary backup capacitor.

11. The method of claim 8 wherein the step of detecting comprises providing power to the base and emitter of a transistor having a base, emitter and collector using the primary power source and upon failure of the primary power source, applying electrical power only to the emitter of the transistor such that it may energize an electric relay switch connected to the collector of the transistor.

12. The method of claim 11 and further comprising the step of providing electrical power to the base of the transistor using a capacitor during brief electrical power interruptions of the primary power source.

13. The method of claim 11 and further comprising the step of providing electrical power to the emitter of the transistor using a capacitor to keep the transistor turned on for a given period of time when the primary power fails.

14. The method of claim 11 and further comprising the step of powering the electric relay switch using a capacitor connected to the emitter of the transistor.

15. The method of claim 8, wherein the step of detecting comprises:
   selectively connecting the primary backup capacitor to the electromechanical actuator through a switch;
   selectively actuating the switch with a switch actuator when the voltage of the primary power source falls below a predetermined level; and
   powering the switch actuator during failure of the primary power source from a secondary backup capacitor being charged from the primary power source.

16. A method for positioning a mechanical device that is controlled by an electromechanical actuator when a primary power source to the electromechanical actuator fails and with the mechanical device having a range of movement with one position being a fail-safe position, comprising the steps of:
   charging a primary backup capacitor to store at least a powering level of energy from the primary power source prior to the primary source failing;
   detecting loss of power being supplied from the primary power source to the electromechanical actuator; and
   supplying power from the primary backup capacitor to the electromechanical actuator in response to detection of loss of power being supplied from the primary power source to the electromechanical actuator, and supplying the power from the primary backup capacitor to the electromechanical actuator for a duration of time required to position the mechanical device in a fail-safe position, which powering level of energy of the charged primary backup capacitor equals or exceeds the energy necessary for the electromechanical actuator to position the mechanical device from any position in its range of movement to the fail-safe position, thereafter terminating supply of power from the primary backup capacitor to the electromechanical actuator.

* * * * *

UNITED STATES PATENT AND TRADEMARK OFFICE
CERTIFICATE OF CORRECTION

PATENT NO. : 5,744,876
DATED : April 28, 1998
INVENTOR(S) : William N. Fangio

It is certified that error appears in the above-indentified patent and that said Letters Patent is hereby corrected as shown below:

Please delete lines 35-38 in Column 3.

Signed and Sealed this

Twenty-third Day of November, 1999

Attest:

Q. TODD DICKINSON

Attesting Officer     Acting Commissioner of Patents and Trademarks